Jan. 7, 1964  R. L. KOSROW  3,116,705
AUTOMATIC CONTROL OF SEWING MACHINE AND ACCESSORY DEVICES
Filed Feb. 13, 1961  12 Sheets-Sheet 1
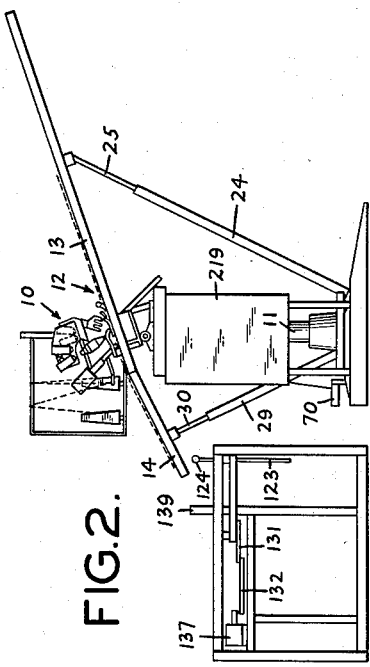
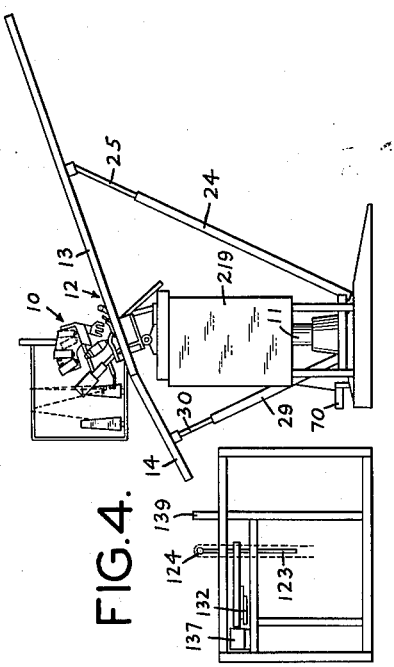
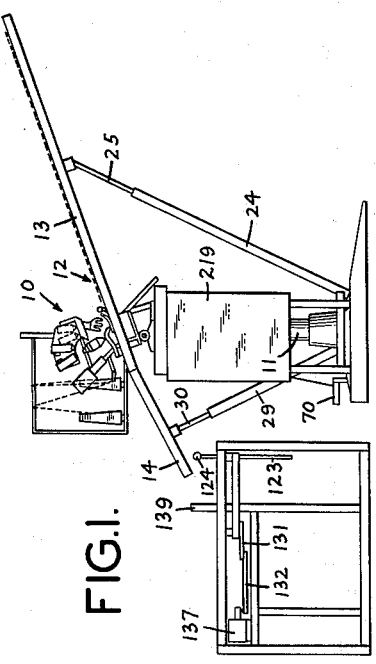
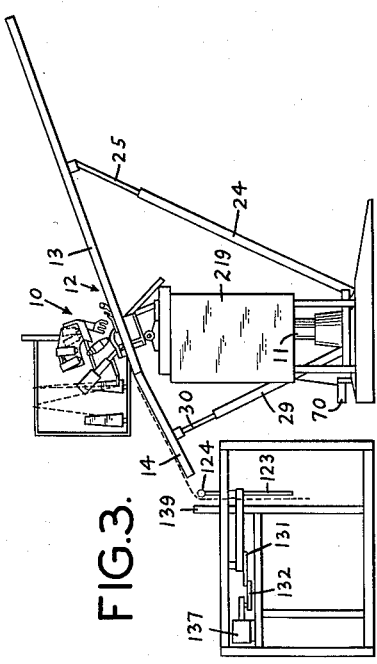

Jan. 7, 1964  R. L. KOSROW  3,116,705
AUTOMATIC CONTROL OF SEWING MACHINE AND ACCESSORY DEVICES
Filed Feb. 13, 1961  12 Sheets-Sheet 4
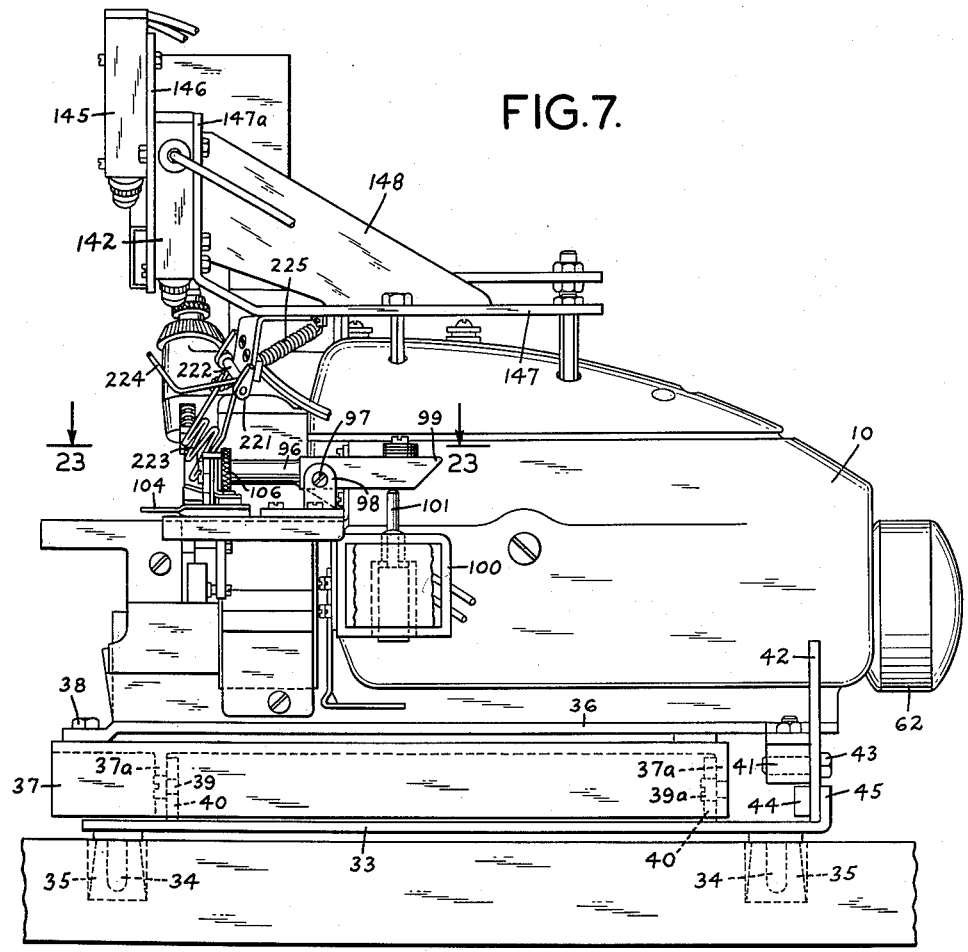
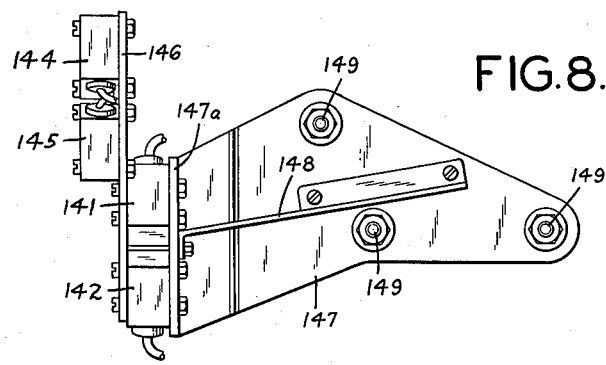

Jan. 7, 1964    R. L. KOSROW    3,116,705
AUTOMATIC CONTROL OF SEWING MACHINE AND ACCESSORY DEVICES
Filed Feb. 13, 1961    12 Sheets-Sheet 5

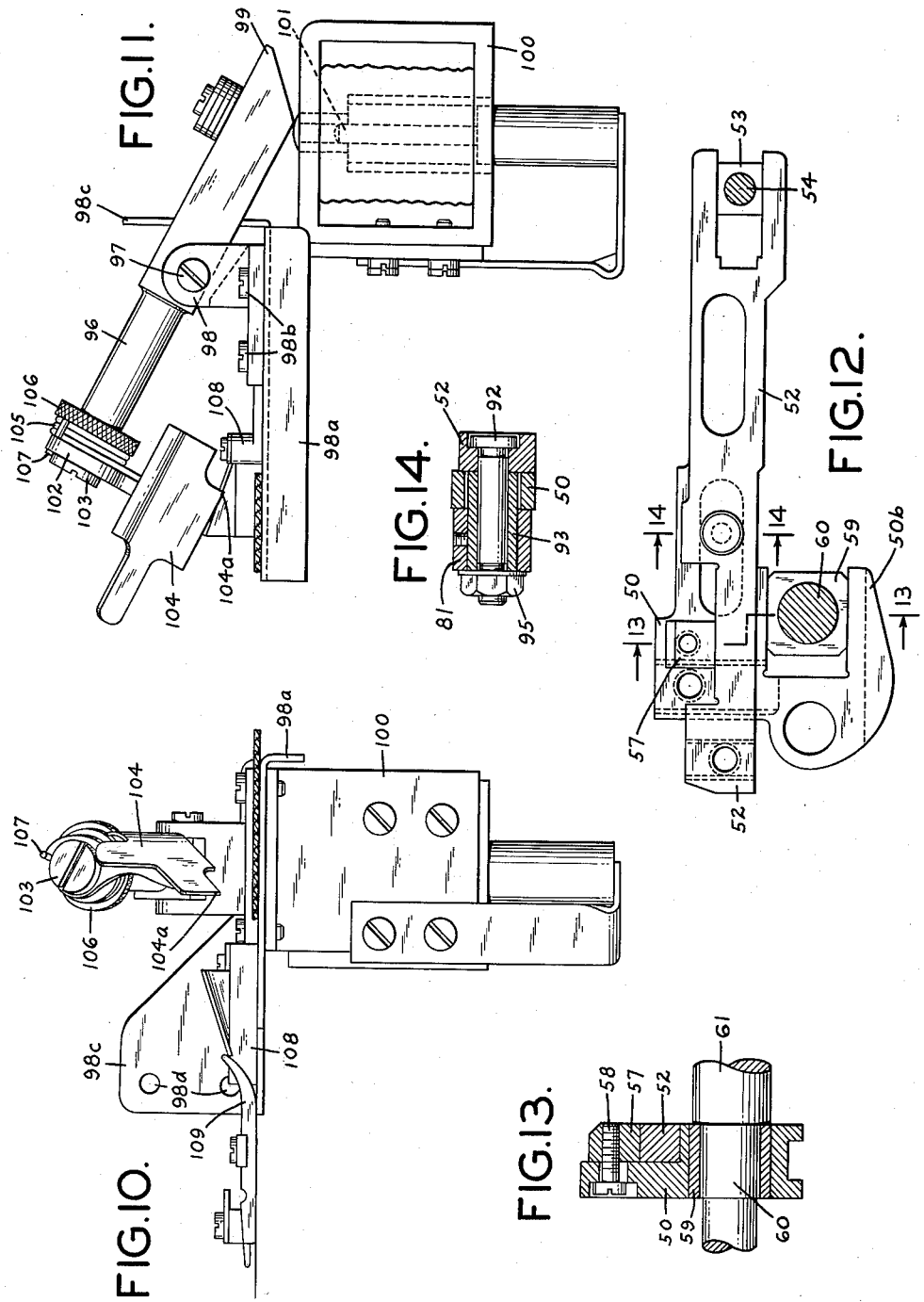

Jan. 7, 1964    R. L. KOSROW    3,116,705
AUTOMATIC CONTROL OF SEWING MACHINE AND ACCESSORY DEVICES
Filed Feb. 13, 1961    12 Sheets-Sheet 7
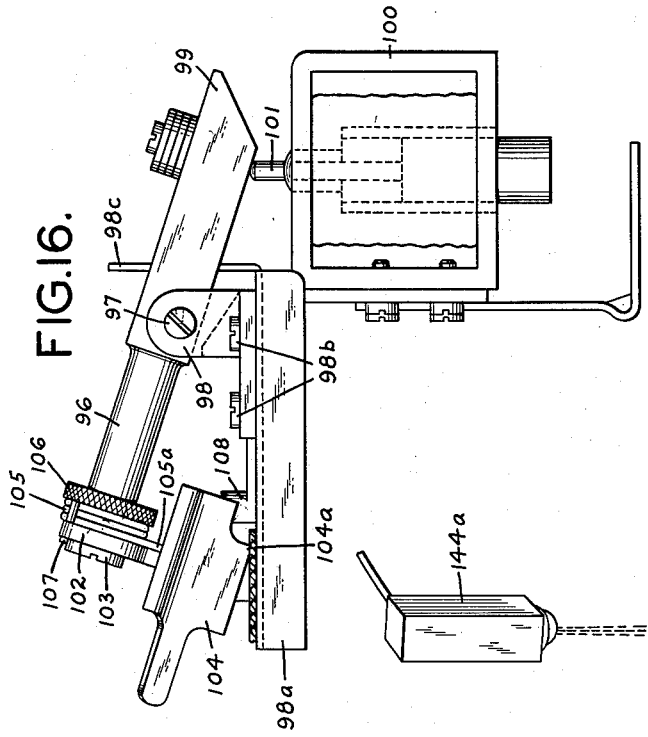
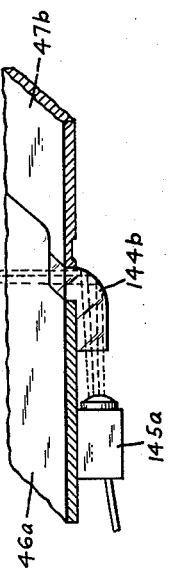
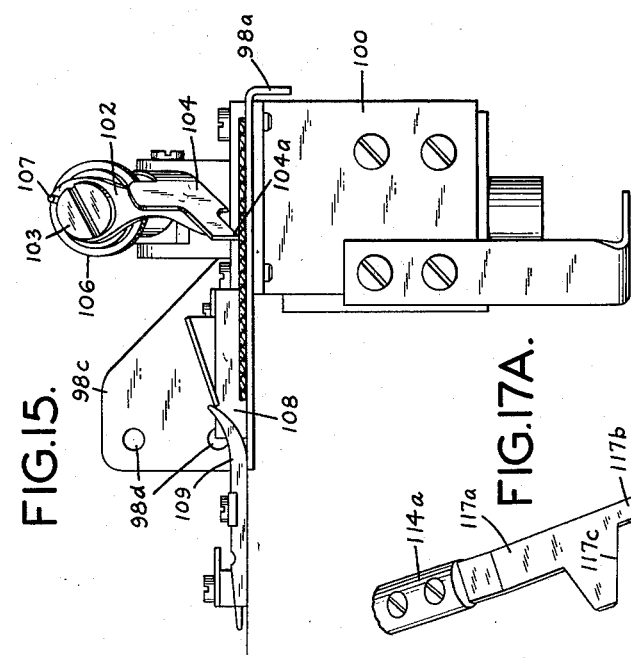
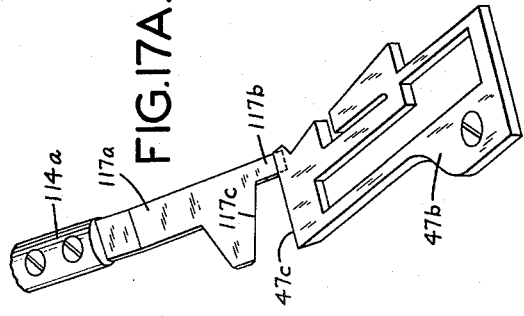

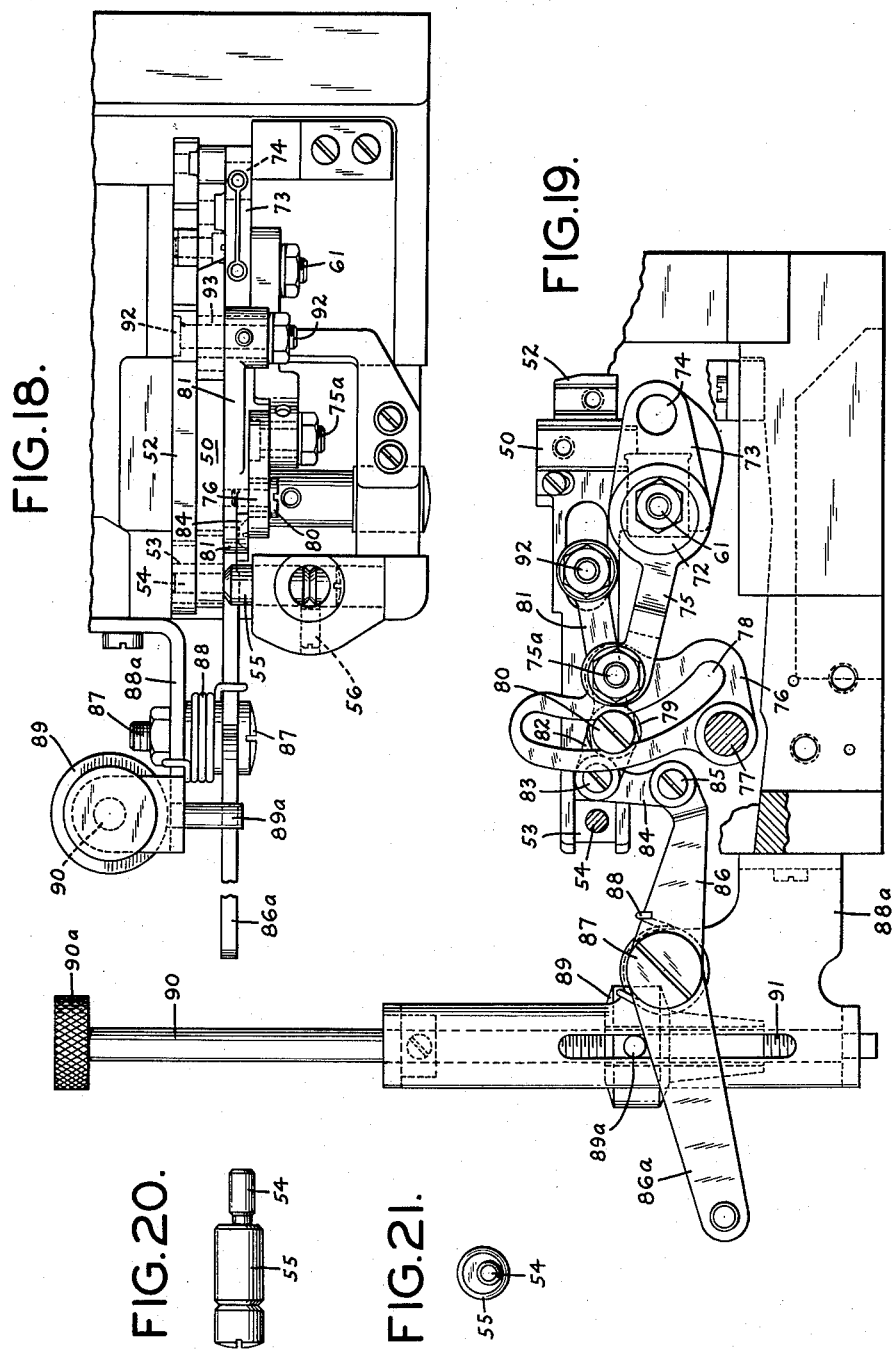

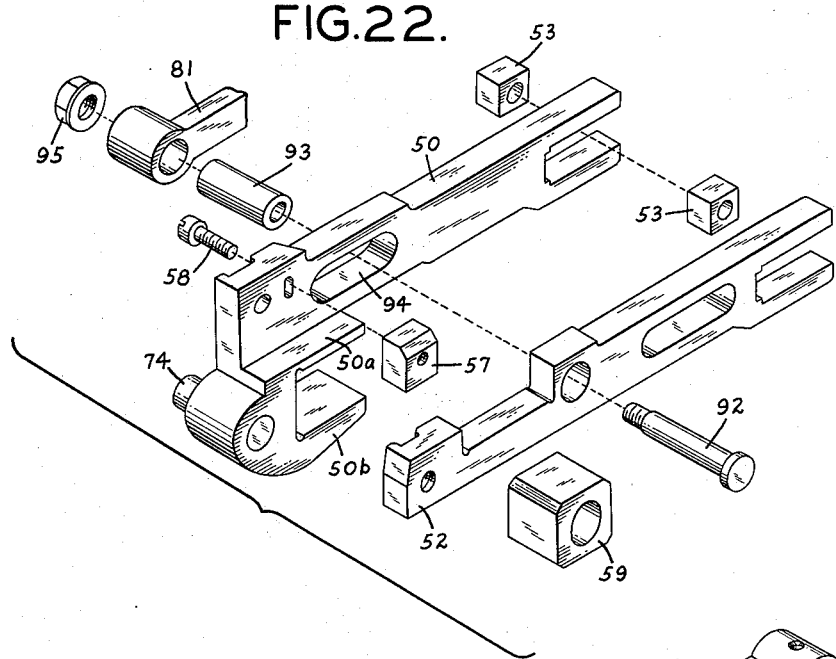
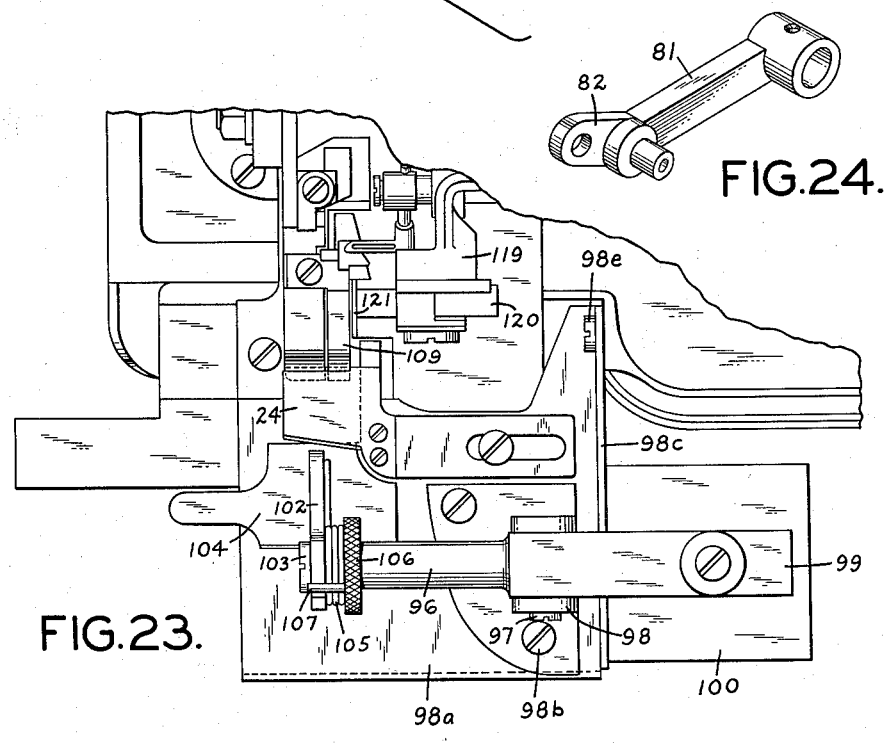

Jan. 7, 1964   R. L. KOSROW   3,116,705
AUTOMATIC CONTROL OF SEWING MACHINE AND ACCESSORY DEVICES
Filed Feb. 13, 1961   12 Sheets-Sheet 10
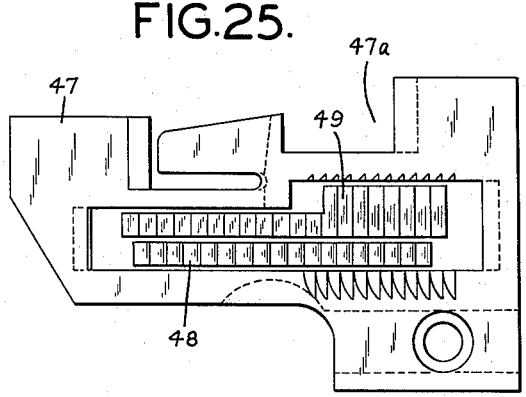
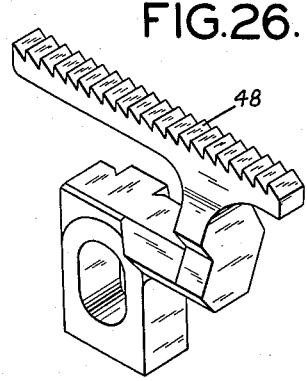
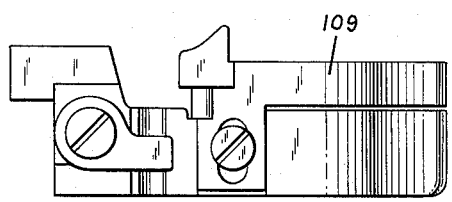
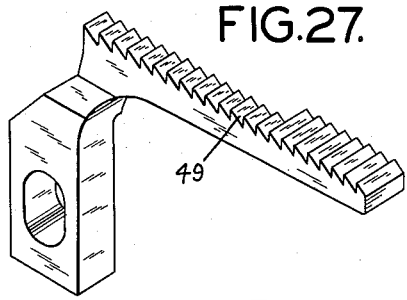
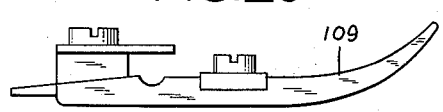
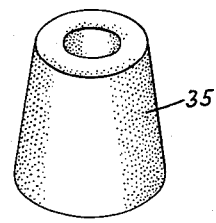
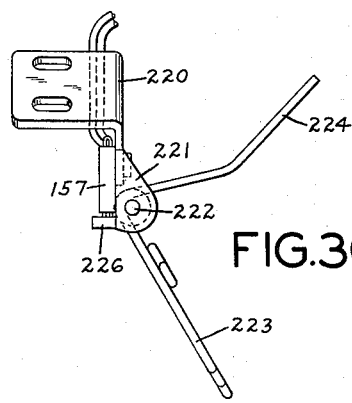
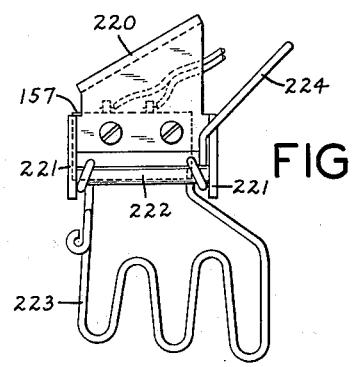

Jan. 7, 1964 R. L. KOSROW 3,116,705
AUTOMATIC CONTROL OF SEWING MACHINE AND ACCESSORY DEVICES
Filed Feb. 13, 1961 12 Sheets-Sheet 11

United States Patent Office 3,116,705
Patented Jan. 7, 1964

3,116,705
AUTOMATIC CONTROL OF SEWING MACHINE
AND ACCESSORY DEVICES
Robert L. Kosrow, Elk Grove Village, Ill., assignor to
Union Special Machine Company, Chicago, Ill., a corporation of Illinois
Filed Feb. 13, 1961, Ser. No. 88,804
20 Claims. (Cl. 112—2)

This invention relates to automatically controlled and operated sewing and work handling mechanism which is particularly adapted for the serging of the edges of work sections, such as sections of trouser legs. It will be appreciated that the edges of such sections to be stitched do not fall along a straight line. They have portions which curve outwardly and inwardly, but not abruptly. Other types of work, having edges of this general character or straight edges, may have an overedge seam applied thereto in accordance with the invention.

The apparatus is such that a large number of fabric sections of the character indicated may be readily fed to and through the stitch forming region of a sewing machine and delivered from the latter to mechanism for automatically stacking the stitched sections. In view of the automatic control of the apparatus, that is provided in accordance with the invention, relatively unskilled operators may be employed and bring about a high rate of production.

In achieving the foregoing purposes of the invention, a work supporting table is provided with an inclined upper surface. The angle of inclination of the table surface may be readily adjusted so that the successive work pieces will readily move downwardly along the surface with a minimum of pulling or pushing force but will not slide so freely as to cause bunching of the material in advance of the stitch forming zone. An overedge sewing machine of suitable character, adapted to provide a desired form of overedge seam, is positioned along the path of movement of the work on the table top, and automatic means are provided for properly positioning the edge of the work in relation to the stitch forming devices of the sewing machine.

The apparatus constructed in accordance with the invention simply requires the operator to place a work piece in approximately the correct position for advance along the sloping table surface to a point slightly in advance of the sewing machine, and from this point on, the machine and an associated work positioner are automatically operated to properly position the work, to trim the edge of the work, apply an overedge seam to the trimmed edge of the work, sever the stitching thread upon completion of the seaming of each section of the work, and advance the work to an automatic stacking device.

All of the foregoing operations of the devices in and associated with the sewing machine and of the stacker are automatically controlled by the advance of the work, to and beyond the sewing machine. Such automatic control of the various parts of the mechanism is accomplished through the provision of a plurality of light-sensitive members, such as photoelectric cells of a type which is rendered electrically conductive when subjected to a beam of light but has a high electrical resistance when not subjected to a beam of light. The arrangement is such that as the work approaches the stitch forming zone a beam of light from a suitable light source is interrupted in its passage to the photoelectric cell so that the latter, through suitable circuits, brings about the operation of the edge trimming, work advancing and stitch forming mechanisms of the machine. Also the interruption of the beam of light brings about the automatic operation of a special work positioning member incorporated in or associated with the sewing machine. This work positioning member is of such a character as to advance the work into the region of the work feeding mechanism of the sewing machine and also to urge the edge of the work to be seamed against a suitable guide surface to insure the correct location of the overedge seam. Moreover, this arrangement is such that the edge to be seamed will be urged against the guide surface at all times in spite of any gradual curvature of the edge of the work incident to the form of the article being produced. Thus the mechanism automatically takes care of any bulging or indentation of the edge of the work to be seamed to conform with the desired contour of a trouser leg section, for example.

Another light-sensitive member, such as a photoelectric cell of the type above described, is subjected to a light beam directed toward the cell from a point at the discharge side of the sewing mechanism. The arrangement is such that when the light beam is interrupted by the passage of the work across the path of the beam and is then allowed to strike the photoelectric cell as the trailing end of the work passes outwardly beyond the stitch forming mechanism, a device will be automatically operated to sever the stitch forming thread and to bring about operation of the stacking mechanism to receive and stack the stitched section of work.

It has been found highly desirable to control the operation of the sewing machine itself, with its edge trimming mechanism, work feeding mechanism and stitch forming devices, entirely by the first-mentioned photoelectric cell. The completion of the various operations upon the remaining portion of the work between the path of the beam which has been interrupted by the work and the various instrumentalities of the sewing machine is readily carried out by the momentum of the driven parts of the machine after the latter has been disconnected from the driving source.

Suitable electrical circuits, appropriately interconnected, have been provided from one or more sources of electric power to bring about the proper sequential control over the various driving or operating means incorporated in the system. These circuits are so coordinated as to bring about the desired timing of the operation of the various work performing instrumentalities, toward the end that a much larger number of work pieces may be handled by the apparatus and given the desired edge trimming and overedge seaming operations that has been possible heretofore.

With the foregoing purposes, features and advantages of the invention in view, a preferred embodiment of the same, with certain special modifications, will now be described in connection with the accompanying drawings, in which:

FIGS. 1, 2, 3 and 4 are front elevational views of the sewing apparatus including the table structure, the sewing machine and the stacking device at different stages in the operation of the unit;

FIG. 7 is a front elevational view of the sewing machine forming part of the apparatus and showing the mounting of the same and the mounting thereon of various attachments;

FIG. 8 is a plan view of certain supporting brackets provided at the top of the sewing machine with the devices retained thereby;

Figure 9:
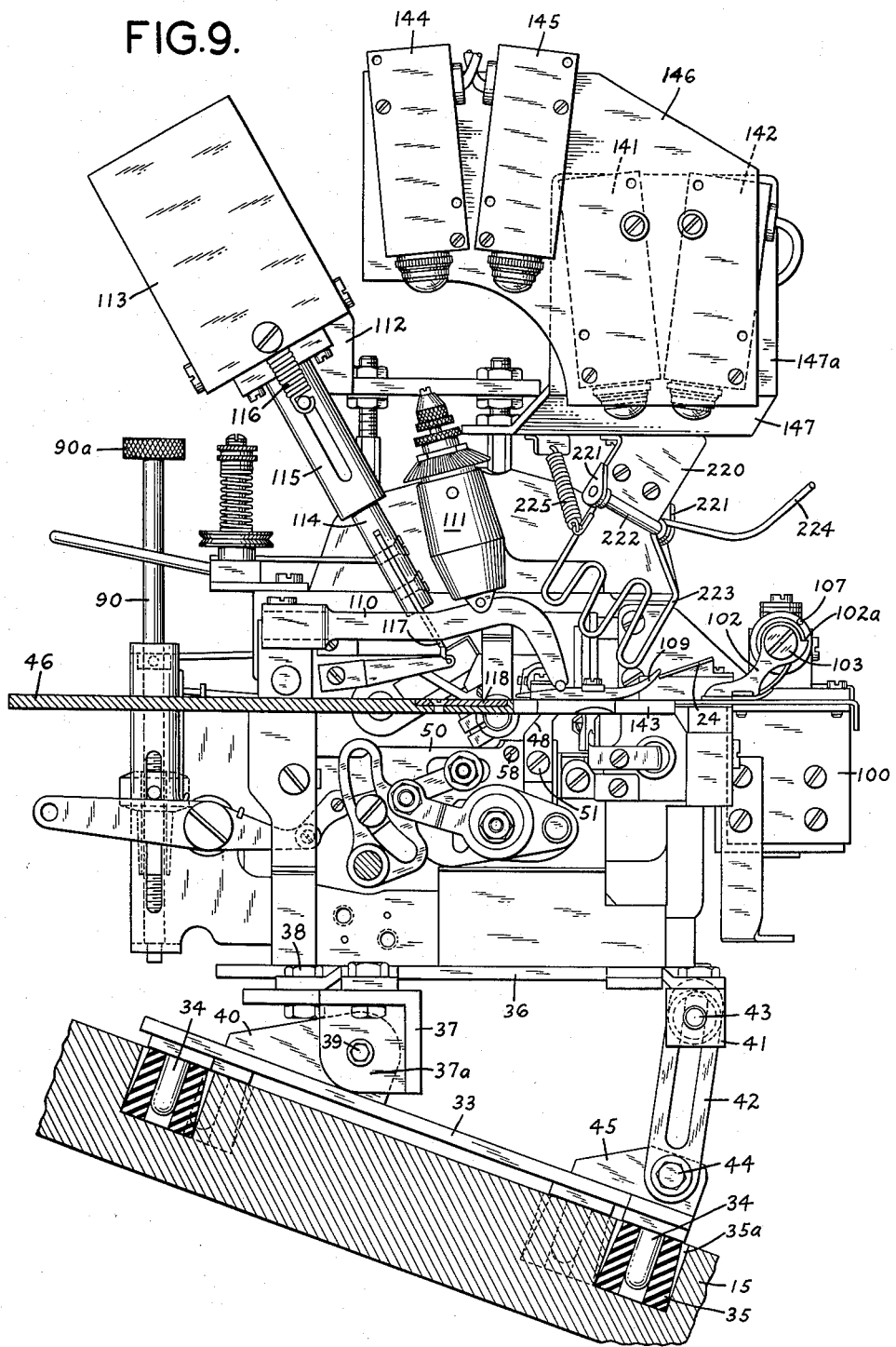
Figure 33:
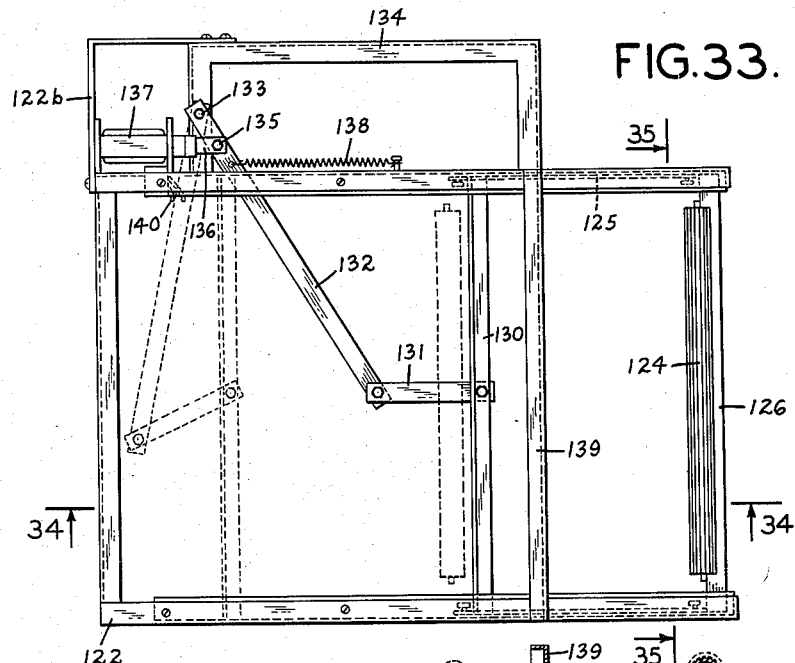
Figure 34:
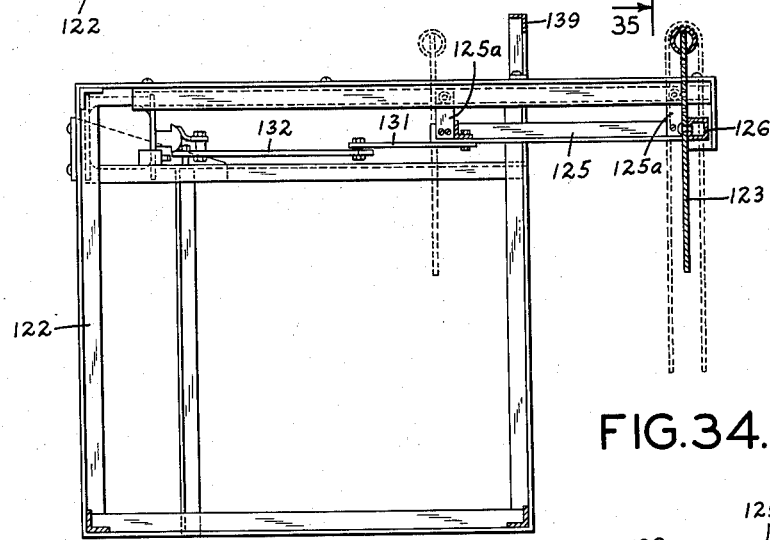
Figure 35:
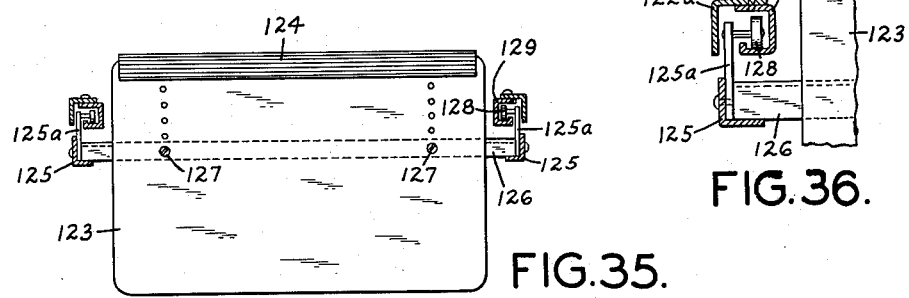
Figure 36:
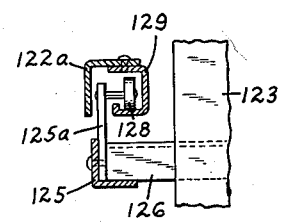
Figure 37:
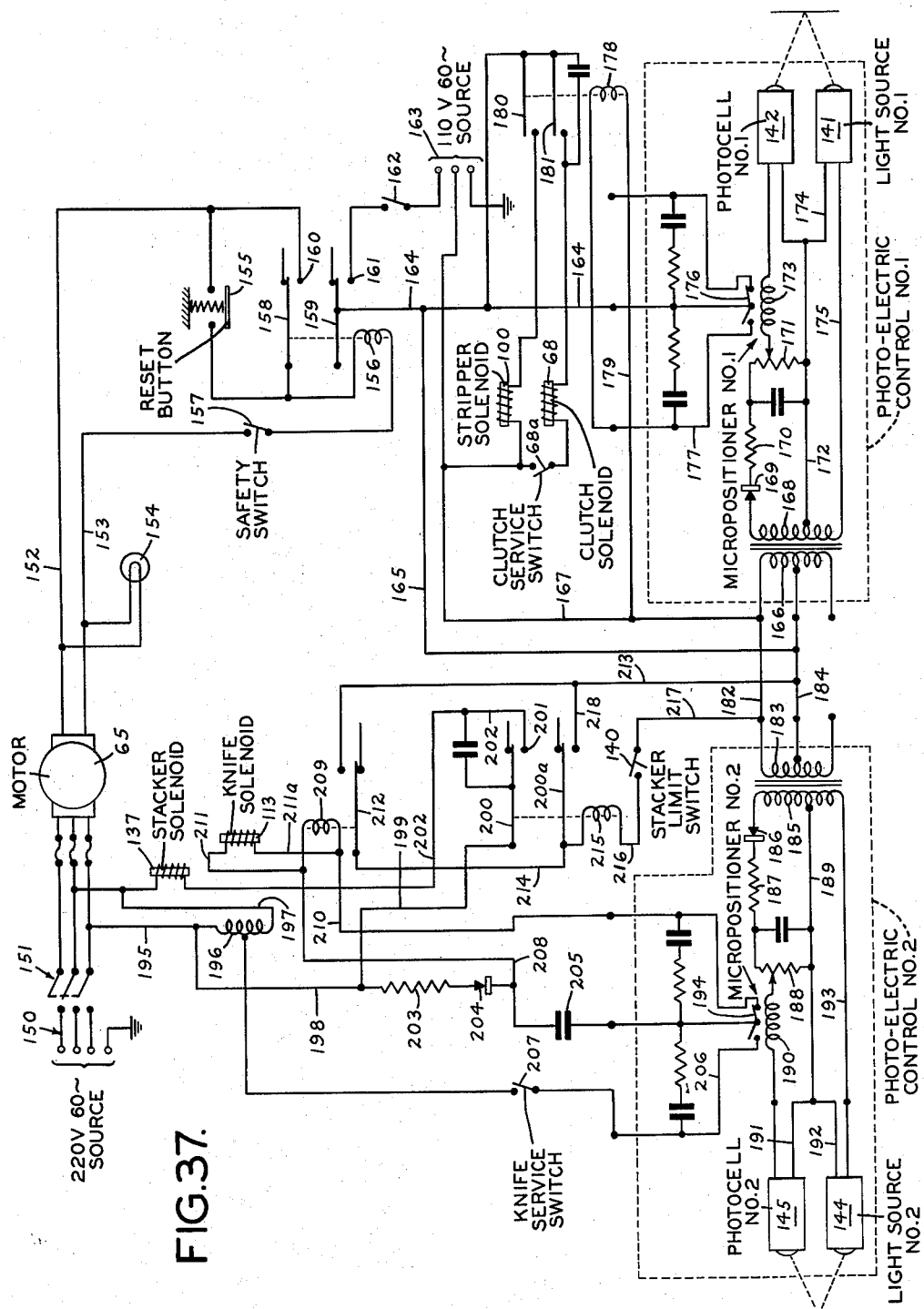

FIG. 9 is an elevational view of the sewing machine, its supporting means and certain attachments as seen from the left in FIG. 7, certain parts being shown in section; in this view the supporting structure at the bottom is shown inclined upwardly at an angle of about 30° but in the actual construction it is disposed horizontally; the angular disposition of the parts, as shown, being for the purpose of illustrating the sewing machine construction more clearly within the space provided;

FIG. 10 is an elevational view of a work positioner device as seen from the front of the apparatus, and shows its relation to the work supporting surface and the presser foot of the sewing machine;

FIG. 11 is an elevational view of the parts shown in FIG. 10 as seen from the right of the latter;

FIG. 12 is a side elevational view of two feed bars embodied in the sewing machine;

FIG. 13 is a vertical sectional view taken along the line 13—13 of FIG. 12;

FIG. 14 is a vertical sectional view taken along the line 14—14 of FIG. 12;

FIGS. 15 and 16 are views similar to FIGS. 10 and 11, respectively, showing the work positioning mechanism in a partially operated position;

FIG. 17 is a perspective view showing a modified relationship between a light source and a photoelectric cell used for controlling certain operations of the apparatus;

FIG. 17A shows a modified form of thread chain cutting mechanism that may be advantageously employed;

FIG. 18 is a plan view of the feed bars of the sewing machine and their operating connections;

FIG. 19 is a side elevational view of the parts shown in FIG. 18 with certain parts broken away;

FIG. 20 is a detail view of an element used for adjusting the height of the supporting means for the rear ends of the feed bars;

FIG. 21 is an end view of the members shown in FIG. 20 as seen from the right of the latter;

FIG. 22 is an exploded perspective view showing the feed bars and certain of their supporting and driving means;

FIG. 23 is a plan view of a portion of the work support of the sewing machine, taken along the line 23—23 of FIG. 7;

FIG. 24 is a perspective view of the member included in the drive means for one of the feed bars;

FIG. 25 is a plan view of a throat plate embodied in the sewing machine and of the feed dogs cooperating therewith;

FIG. 26 is a perspective view of the main feed dog;

FIG. 27 is a perspective view of an auxiliary or differential feed dog;

FIG. 28 is a plan view of the presser foot of the sewing machine;

FIG. 29 is a side elevational view of the presser foot;

FIG. 30 is an elevational view of a finger guard and its supporting bracket, together with a switch operated upon engagement of the finger guard;

FIG. 31 is a view of the parts shown in FIG. 30 as seen from the right thereof;

FIG. 32 is a perspective view of a vibration isolator of the character used for supporting the sewing machine on the supporting structure;

FIG. 33 is a plan view of the work stacking mechanism of the machine;

FIG. 34 is a vertical sectional view of the work stacking mechanism taken along the line 34—34 of FIG. 33;

FIG. 35 is an elevational view of a work receiving member of the stacker with its supporting means shown in section;

FIG. 36 is an enlarged detail view of the supporting means shown at the left side of FIG. 35; and FIG. 37 is a circuit diagram showing the electrical connections provided in the system for controlling the operation of the various devices.

Figure 5:
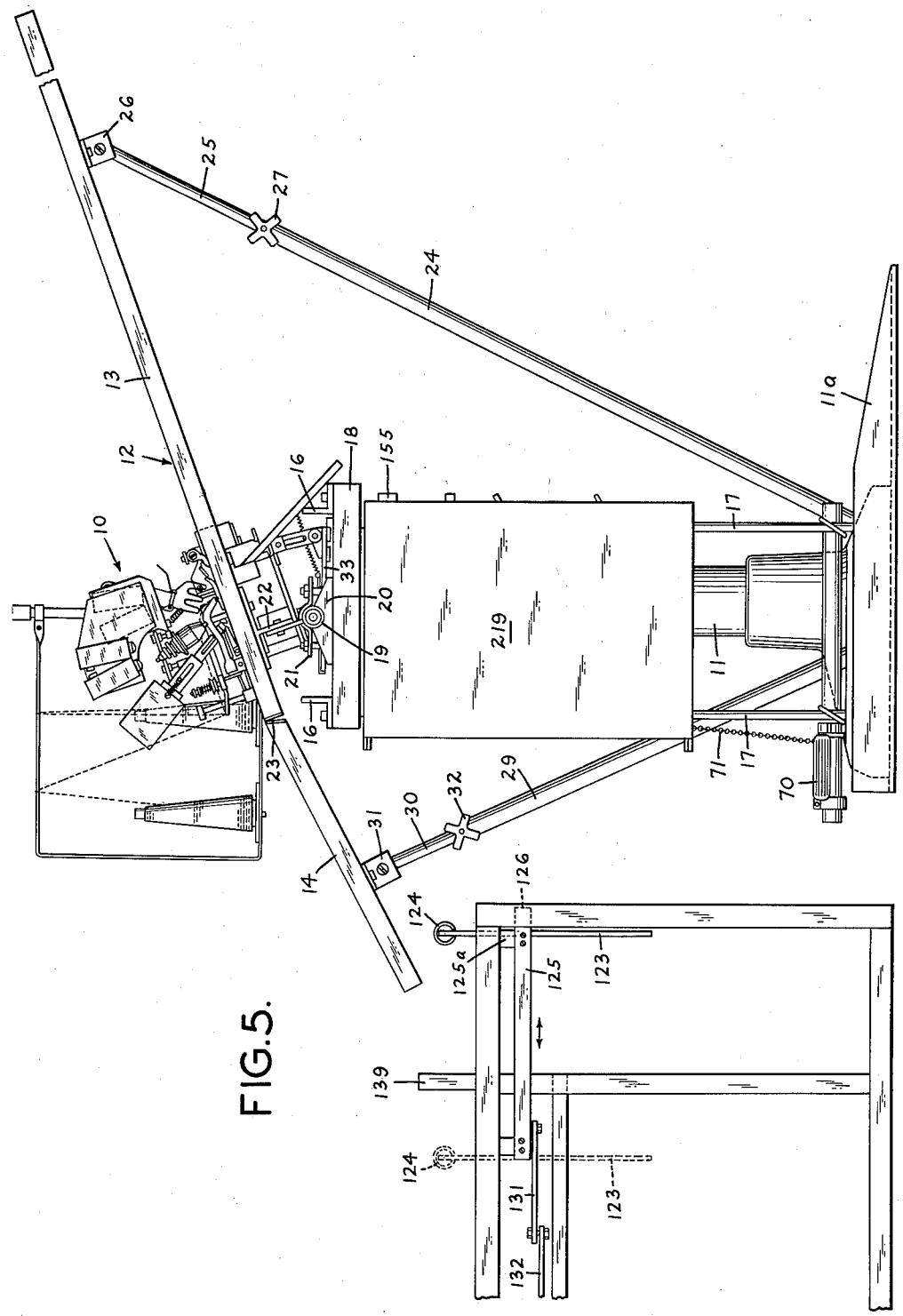
FIG. 5 is an enlarged elevational view of the apparatus as shown in FIG. 1, a portion of the stacking mechanism being omitted.

Referring now to FIG. 5, the sewing apparatus is shown as comprising a sewing machine 10 which may suitably be of the overedge sewing type sold by the Union Special Machine Company under Class 39500S for the purpose of serging the edges of trouser sections and which is preferably adapted to form a two-thread overedge stitch of the 503 type. It may, however, be adapted to produce a 504 or 505 type overedge stitch. The stitch forming, work feeding and edge trimming mechanism of the machine may be of the character disclosed in the Wallenberg et al. patent, No. 2,704,042, granted March 15, 1955, although as depicted herein it embodies certain modifications of the mechanism disclosed in said patent. For example, the work feeding mechanism disclosed is operated by devices of the character shown in the Wallenberg et al. Patent No. 2,965,056, granted December 20, 1956.

Figure 6:
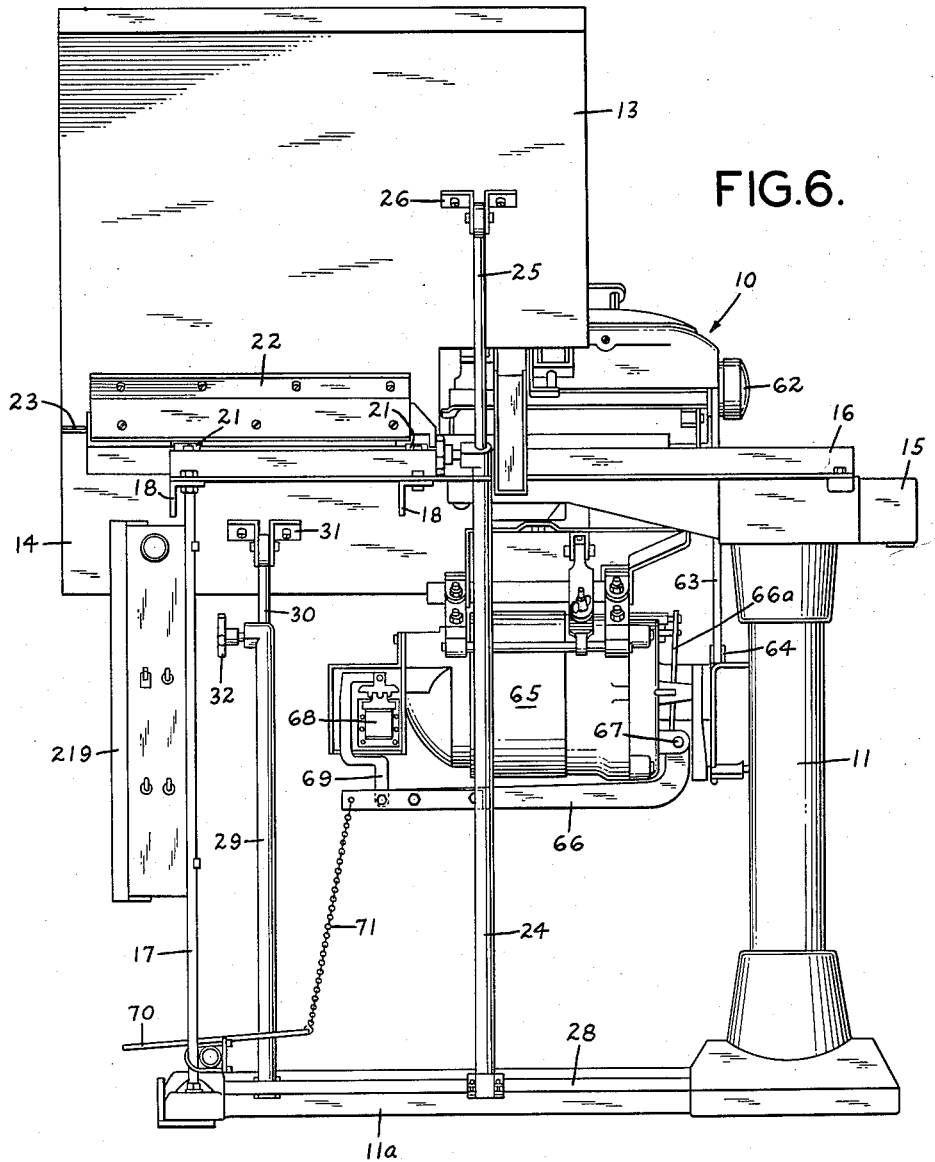
FIG. 6 is a side elevational view of the apparatus, as seen from the right in FIG. 5.

The sewing machine is supported by a vertical column 11, the height of which may be made adjustable if desired. A work supporting table 12, preferably having two parts 13 and 14, is suitably disposed in relation to the sewing machine for the delivery of work pieces along a downwardly sloping surface to the regularly provided work supporting surface of the sewing machine itself and to carry the finished work pieces away from the sewing machine. For supporting the sewing machine and work table there is mounted, on the upper end of the column 11, a horizontally disposed supporting arm 15 (FIG. 6). To the upper surface of this supporting arm there is secured a pair of spaced parallel angle irons 16 which extend outwardly beyond the left end of the arm 15 and are supported at their outer ends by posts 17 extending upwardly from a base portion 11a of the supporting column. Secured to the undersides of the angle members 16 are a pair of angle members 18 which extend at right angles to the members 16. The angle members 18 are arranged to support a shaft 19 which is clamped to the upper surface of each of the members 18 by an upwardly extending flange 20 provided on each of these angle members and a clamping element 21 (FIG. 5). Arranged for swinging movement about the shaft 19 is a cylindrical portion at the lower end of a bracket 22 secured to the undersurface of the table top 13. In this way, provision is made for varying the angle of inclination of the table top section 13. Section 14 of the table top is connected with the lower end of section 13 by a hinge 23. To maintain the section 13 at a selected angle of inclination it is connected at an intermediate point with a telescopically extensible support 24, 25 the upper end of which is pivotally connected to a bracket 26 secured to section 13. A handle or knob 27 connected with a screw stud may be turned to free the member 25 for sliding movement within the member 24 of the telescopic support until the desired angle of inclination has been provided for the table section 13. Handle 27 may then be turnd to retain the parts in a set position. The lower end of member 24 is pivotally mounted on a rod 28 carried by the base of the supporting column structure.

As previously stated, the section 14 of the table top is connected with the lower end of the section 13 by a hinge construction 23. The arrangement is such that the angle of inclination of section 14 to the horizontal may be made somewhat greater than the angle of inclination of section 13. To retain the section 14 in a desired position it is supported, at an intermediate point, by a telescopic member 29, 30 the upper end of which is pivotally connected to a bracket 31 secured to the underside of section 14 (FIG. 5). A handle 32, connected with a set screw, may be turned to release the element 30 of the telescopic member for sliding movement within the element 29. When the proper adjustment has been made the handle 32 may be turned in the opposite direction to retain the parts in adjusted position. At its lower end the element 29 is pivotally connected with a rod parallel with and of the same character as the rod 28. As viewed in FIG. 6, the rod to which the element 29 is thus connected is some distance in the rear of the rod 28.

The sewing machine is mounted on a plate 33 (FIG. 9) having a plurality of downwardly extending pins 34, each of which is provided with a frusto-conical vibration isolator 35 shown in perspective in FIG. 32. These vibration isolators are fitted into recesses 35a provided in the top of the arm 15 of the support structure. It will be understood that the arm 15 is actually disposed horizontally and it is illustrated in an inclined position in FIG. 9 simply to make possible the showing of the sewing machine structure on the drawing in suitable size. A member 36 secured to the bottom of the sewing machine frame is actually inclined downwardly from right to left at an angle corresponding with the inclination of the section 13 of the table top. A bracket member 37 is secured by a bolt 38 to the member 36 and this bracket has spaced wall portions 37a having alined openings arranged to receive screws 39 which also pass through alined openings in upwardly extending elements 40 integral with or otherwise secured to the plate 33. Elements 40 are fitted between the spaced walls 37a and the arrangement is such as to provide for rocking movement of the sewing machine frame about the axis of the bolts 39. Adjacent the right end of the member 36 (FIG. 9) there is provided a downwardly extending block 41 to which is connected a slotted link 42. A bolt 43 carried by the block 41 and cooperating with the slot in the link 42 serves to retain these parts in any desired position of adjustment in relation to each other. At its lower end the link 42 is pivotally connected by means of a bolt 44 with an upwardly extending flange 45 at the right end of the supporting plate 33. It will be understood that by adjusting the position of the bolt 43 in relation to the slot in the link 42, the angular relation between the members 33 and 36 may be varied and these parts may then be locked in set position by tightening the bolt 43. The member 36 will be set at the same angle of inclination to the horizontal as the section 13 of the table top so that a work supporting cloth plate 46 (FIG. 9) of the sewing machine is disposed with its top flush with the top of the section 13 of the table. In the region of stitch formation the cloth plate 46 is provided with an opening in which is fitted a throat plate 47 which is shown in detail in FIG. 25. This throat plate is provided with an opening through which two side by side feed dogs 48 and 49 may be lifted and moved longitudinally to impart the desired feeding action to the work as it is being stitched. The preferred form of the two feed dogs is indicated in FIGS. 26 and 27, that designated 48 and shown in FIG. 26 being the main feed dog and that designated 49 and shown in FIG. 27 being a differential feed dog which is preferably given a slightly greater feed stroke than the main feed dog.

The feed dog 48 is secured to a feed bar 50 by means of a screw 51 (FIG. 9). Similarly, the feed dog 49 is secured to the forward end of a feed bar 52. At their rearward ends both feed bars are slidably carried by blocks 53 (FIGS. 12 and 22) which are mounted on the frame of the machine in a manner to permit vertical adjustment of the rear ends of the feed bars. For this purpose they are rockably carried by an eccentric extension 54 of a pin 55 (FIG. 18) rotatable in a suitable opening in the frame. The forward end of pin 55 may be provided with a screw driver receiving slot to facilitate such turning, and when appropriately adjusted it may be locked in set position by a set screw 56. Adjacent its forward end the feed bar 52 is slidably supported on a laterally extending surface 50a of the feed bar 50 and it is held for free sliding movement thereon by a block 57 which is adjustably secured to the feed bar 50 by a screw 58 (FIG. 22). The forward end of feed bar 50 is provided with a rearwardly extending arm 50b which, with the upper portion of the bar, provides a rectangular opening arranged to receive a substantially rectangular block 59. The latter, as shown in FIG. 13, is mounted on an eccentric portion 60 of the main drive shaft 61 of the sewing machine. It will be seen that rotation of the shaft 61 will impart lifting and lowering movement to the forward end of the feed bar 50 and also to the feed bar 52, by virtue of the sliding connection of the latter with the feed bar 50. Shaft 61 is connected with a suitable power source through a combined handwheel and pulley 62 (FIG. 7). A belt 63 (FIG. 6) serves to connect the member 62 with a pulley 64 on the driven shaft of an electric motor and clutch unit. The motor is shown at 65 and a clutch operating arm is shown at 66. This arm is pivotally mounted on the unit by a pin 67 and the arrangement is such that when the arm is swung downwardly, i.e. in a counterclockwise direction, it serves to engage the clutch of the unit. A spring 66a normally serves to rock the arm 66 in a clockwise direction to cause disengagement of the clutch. The clutch employed may be of the character disclosed in the patent to Turner, Nos. 2,739,680 and 2,822,903 granted, respectively, on March 27, 1956, and February 11, 1958. However, the brake mechanisms may be omitted or so adjusted that they will permit substantial over-running of the sewing machine when the arm 66 is released. In accordance with the invention the operation of the arm 66 is automatically controlled through the delivery of current to a solenoid 68 which is energized whenever the control system dictates the operation of the sewing machine. The armature of the solenoid is connected with the arm 66 by a link 69. In the normal operation of the machine there is no need for manual control of the clutch, but provision is made for its operation at will from a treadle 70 connected by a chain 71 with the outer end of the arm 66. This is to enable a serviceman to bring about operation of the machine for repair and adjustment purposes, without the necessity of causing operation of the automatic controls.

For imparting feed and return movements to the two feed bars, there is mounted on the main drive shaft 61, for rotation therewith, a pair of eccentrics 72 disposed in side by side relation but being angularly displaced with respect to each other through an angle of about 180°. One of these eccentrics cooperates with a pitman 73 which extends forwardly and has its forward end connected with a pin 74 projecting laterally from the main feed bar 50. The other eccentric 72 has connected therewith a pitman 75 the rearward end of which is connected by a screw stud 75a with a rocker 76 mounted on a shaft 77. The rocker 76 has an elongated arcuate opening 78 therethrough in which is mounted, for sliding movement, a block 79 secured by a screw stud 80 to a member 81 (FIGS. 19 and 24). Rearwardly of the screw stud 80 the member 81 is provided with an angularly extending arm 82 the outer end of which is connected by a screw stud 83 with a link 84. At its lower end, this link is pivotally connected by a bolt or screw stud 85 with the forward end of a lever 86 rockably mounted upon a screw member 87 carried by a bracket 88a secured to the frame of the machine. A spring 88 is arranged to normally urge the lever 86 in a clockwise direction. The normal position of the lever 86 under the influence of the spring 88 is determined by the engagement of a rearwardly extending arm 86a of the lever with a laterally extending pin 89a secured to a vertically movable block 89. Adjustment of the block 89 vertically may be effected by a screw member 90 having a knurled head 90a and having a screw threaded lower end 91 cooperating with a screw threaded opening in the block 89. It will be apparent that the lower the position of the pin 89a the higher will be the position of the block 79 in the arcuate opening 78. This in turn will lead to a greater feed stroke being imparted to the differential feed dog. For imparting feed and return movements to the differential feel bar 52 the forward end of link 81 is connected by a screw stud 92 with the feed bar 52. The arrangement for this purpose is best shown in FIGS. 14 and 22. Screw stud 92 passes through an opening in the feed bar 52 and carries on the opposite side of the latter a sleeve 93 which is arranged to ride in an elongated opening 94 in the feed bar 50. A portion of sleeve 93 is carried by a hub-like extension of the lever 81 and the parts are held in assembled relation by a nut 95 cooperating with the screw threaded end of member 92.

Turning now to the automatic work positioning mechanism of the system, this is best shown in FIGS. 9, 10, 11, 15, 16 and 23. It comprises a member 96 mounted for rocking movement about the axis of a screw element 97 carried by a bracket 98 attached to an auxiliary cloth plate 98a by means of screws 98b. Cloth plate 98a has an upstanding portion 98c having two holes 98d through which screws 98e (FIG. 23) pass to attach the plate to the frame of the sewing machine. At its right end (FIG. 11) the member 96 has a weighted extension 99 which tends to rock the member normally in a clockwise direction. A solenoid 100 has its armature 101 arranged to engage the undersurface of the weighted end 99 of the rock member, and upon operation of the solenoid in the manner to be explained it serves to rock the member in a counterclockwise direction until it assumes a substantially horizontal position. An arm 102 of a work engaging element of the work positioner is secured by a screw stud 103 to the left end of the member 96. Integral with the arm 102 is a work engaging portion 104, preferably having the configuration shown. A spring 105, surrounding the member 96 and having one end connected with a pin 107 secured to a knurled disk 106, has its other free end 105a in engagement with the upper surface of part 104 of the work positioner. When the member 96 is in its normal tilted position, as shown in FIG. 11, the spring 105 urges the member 102, 104 into the position shown in FIG. 10 in which the arm 102 has its vertical axis substantially in a vertical plane through the axis of the member 96. At this time a shoulder 102a on the arm 102 (FIG. 9) is in engagement with the pin 107. However, when the solenoid 100 is energized and the member 96, 99 is rocked about the pivot 97, the part 104 of the work positioner will be carried into engagement with the work and as this movement continues the member 102, 104 will be rocked in a clockwise direction (FIG. 10). The initial engagement of part 104 with the work is indicated at 104a in FIG. 16. The final position of the part 104 is shown in FIGS. 9 and 23. It will be appreciated that in the rocking of the arm 102 to bring the part 104 into its final position, the corner 104a will move the work both rearwardly toward the presser foot 109 of the sewing machine and also laterally toward a work guiding element 108. Thus, the two directional movements imparted to the work will position it correctly with its edge against the surface of guide 108 and will also carry the forward end of the work beneath the presser foot and into cooperation with the work feeding mechanism of the sewing machine. Also it has been found that the work positioner serves to maintain the edge of the work against the surface of the guide 108 as the work is drawn through the sewing machine by the feed dogs. This is in spite of any minor inward or outward curves provided in the edge of the work so that the machine automatically takes care of curvatures of the type found in the edges of trouser sections and the like. One rather startling observation in this connection is that the mechanism described serves to retain the edge of the work against the guide surface in spite of the fact that the differential feed dog, which is closest to the guide surface, is given a slightly greater feed stroke than the main feed dog.

The presser foot 109 is pivotally connected with an arm 110 which may be rocked downwardly about a horizontal axis and also swung outwardly about a vertical axis. It is normally urged downwardly under the pressure of a spring within a housing 111 (FIG. 9). This construction is well known in the art and need not be further described.

Means are provided in rear of the presser foot for severing the thread chain between successive work pieces. For this purpose a bracket 112 is mounted on the top of the sewing machine housing and to this bracket is secured a solenoid 113. The solenoid has an armature or plunger 114 extending downwardly at an angle from the main structure and guided within a sleeve 115. A spring 116 having one end connected with the main frame of the solenoid and having its other end connected with a pin extending laterally from the plunger 114 normally serves to retain the latter in its uppermost position, as shown in FIG. 9. The plunger 114 has secured thereto a cutter blade 117, the lower end of which is disposed at a slight angle to a vertical plane extending transversely of the thread chain. When the solenoid is energized, in the manner to be explained, the plunger 114 is forced quickly downwardly and the cutting edge of the blade 117 strikes the thread chain and crushes it against a hard metal plate 118 carried by the cloth plate 46. This brings about a quick severance of the thread chain. As will be explained, the solenoid is only momentarily energized, so that the plunger 114 is quickly retracted by the spring 116.

In FIG. 17a, a slightly modified thread chain cutter is shown. It will be understood that the plunger 114a in this view corresponds with the plunger 114 described above and is normally urged upwardly by a spring but is forced downwardly at the appropriate time by energizing a solenoid of the character shown at 113 in FIG. 9. In this modified construction a cutter blade 117a is provided, this having a tongue 117b at its lower end which slides downwardly along a cutting edge 47c provided at the rear end of a modified form of throat plate 47b. It will be understood that the thread chain is advanced rearwardly over the surface of the throat plate and carried between stationary cutting edge 47c and an inclined cutting edge 117c on the blade 117a.

The sewing machine is preferably provided with an edge trimming mechanism for trimming the edge of the work as it advances toward the stitch forming region. This trimming mechanism is of known construction and may be of the character disclosed in the Wallenberg et al. patent, No. 2,704,042. It comprises an arm 119 which is rocked by suitable connections from the main drive shaft of the sewing machine. At the forward end of the arm 119 there is provided a head upon which may be clamped a diagonally downwardly disposed cutter blade 120. This blade cooperates with a stationary blade 121 carried by the frame of the sewing machine in the region 47a of the throat plate 47 (FIG. 25).

Turning now to the automatic stacking mechanism for the stitched work sections as they are discharged from the sewing machine, this is best shown in FIGS. 1–4, 5 and 33–36, inclusive. It comprises a supporting frame structure 122 which may suitably be of angle iron construction. A shiftable, substantially vertically disposed plate 123, having mounted along its upper edge a friction surface, substantially cylindrical member 124 formed of rubber or the like, is adapted to receive the work pieces as they are discharged from the lower section 14 of the table top. The plate 123 is then shifted in a direction perpendicular to its face at a time and at a rate to insure the positioning of the successive work pieces with about their mid portion disposed over the member 124 so that half of the work piece drops along one face of the plate 123 and the other half drops over the other face of the latter. The arrangement is such that a predetermined number of work pieces may be stacked, one on the other, and when the desired number of work pieces have been so stacked they are removed by the operator so that the device is ready to create a new stack.

Plate 123 is mounted on a carriage comprising an angle member 125 at each side extending horizontally in a direction perpendicular to the plane of the plate. An angle member 126 secured by screws 127 to the plate is connected at its opposite ends with the angle members 125. Each of the latter has two upwardly extending arms 125a, one at the forward end and the other at the rear end of member 125. These upwardly extending arms 125a carry rollers 128, preferably formed of nylon, which are arranged to ride in a channel member 129 carried by an angle member 122a of the main frame structure. Adjacent the right ends of the members 125 (FIG. 33) they are interconnected by an angle member 130. The latter has pivotally connected therewith, at its central point, an arm or link 131 the outer end of which is pivotally connected with an arm or link 132 having its opposite end pivotally mounted on a pin 133 carried by a lateral extension 134 of the main support frame. A pin or bolt 135 secured to the arm 132 at a point adjacent but spaced a slight distance from the pivot pin 135 provides a pivotal connection between the arm 132 and a plunger or armature 136 of a solenoid 137. When the latter is energized the plunger 136 will be drawn inwardly (toward the left in FIG. 33) and will draw the links 132 and 131 into the dotted line position indicated in FIG. 33. Upon deenergization of the solenoid the parts will be restored to the full line position shown in FIG. 33 by a spring 138.

As will be explained later, the solenoid 137 is energized as a work piece is discharged from the sewing machine and is permitted to slide under gravity along the surface of section 14 of the table top. The sequence of operations is indicated in FIGS. 1–4, inclusive. As the sewing machine receives a work piece to be stitched, the stacking member 123 will be in the position indicated in FIG. 1, below the outer end of section 14 of the table top. It will remain in this position as the stitching operation proceeds as indicated in FIG. 2. However, as soon as the work piece is released from the presser foot of the sewing machine, and commences to slide by gravity, the solenoid 137 is energized, under control of a photoelectric cell, and the member 123 receives the work while said member is moving outwardly from beneath the lower end of section 14 toward the position indicated in FIG. 3. Continued movement of member 123 toward the left will cause the balance of the work to drape itself over the member 124 and become disposed on the opposite face of member 123, as shown in FIG. 4. A cross member 139, of inverted U-shape form, carried by the top of the frame structure assists in insuring the folding of the work piece over the member 124. When the stacker plate 123 reaches its leftmost position, as indicated in dotted lines in FIG. 33, the link 132 will engage a finger 140 which serves to operate a switch to break the circuit through the solenoid 137. At this time the spring 138 will return the parts to their original position.

As has been stated, one of the primary purposes of the invention is the provision of automatic means for controlling the operation of the sewing machine and the other devices which have been described. This automatic control is brought about by two photoelectric cells each having a source of light associated therewith adapted to direct a beam of light against the lens of the photoelectric cell whenever the path of the beam is not interrupted. Referring to FIG. 9 there is shown a light source 141 and a photoelectric cell 142 which are so arranged that a beam of light from the source 141 will strike a highly polished, reflecting surface on a plate 143 along which the work is advanced toward the presser foot 109. When no portion of a piece of work is moving along the surface of plate 143, the light from source 141 will be reflected and strike the photoelectric cell 142. However, when work is being advanced over the plate 143, this light beam will be interrupted and will not be reflected toward the photoelectric cell. Similarly, a light source 144 and a photoelectric cell 145 are so arranged that a beam of light from source 144 strikes the highly polished, light reflecting surface of plate 118 inserted in the cloth plate of the sewing machine and will be directed upwardly from the latter to the photoelectric cell 145. This cell is thus energized so long as no work is being advanced over the surface of the plate 118 in the path of the light beam. However, when work is so advanced through the path of the light beam, the photoelectric cell 145 will not be energized to reduce its normally high resistance.

The two light sources and the two photoelectric cells described are suitably mounted on the top of the sewing machine. For this purpose they are secured by screws or the like to a plate 146 (FIGS. 7, 8 and 9) which in turn is secured by bolts to a vertically disposed portion 147a of a bracket 147 having its major portion substantially horizontal, or actually inclined to the horizontal at the same angle as the table section 13. The bracket 147 is secured to the top of the sewing machine by suitable bolts 149. A vertically disposed member 148, secured at one end to the top of the horizontal portion 147 of the bracket and at the other end to the vertically disposed portion 147a of the bracket, serves to reinforce the frame structure which carries the two light sources and photoelectric cells mentioned.

In FIG. 17 there is shown a modified relationship between the light source and photoelectric cell which may be used for each of the two units described above. This view illustrates the arrangement of a light source 144a and a photoelectric cell 145a which may replace the light source 144 and cell 145 shown in FIG. 9. The beam of light from source 144a is directed against a light beam deflecting member 144b formed of a suitable plastic such as Lucite and provided with an L-shaped configuration. This serves to divert the light beam through an angle of 90° and directs it toward the cell 145a. The member 144b is suitably positioned between the cloth plate 46a and throat plate 47b so that the top surface of member 144b is in the path of the work just as it emerges from the left end (FIG. 9) of the presser foot of the sewing machine. A similar arrangement of light source and photoelectric cell may be used in lieu of the members 141 and 142, with the member 144b having its top surface just in advance of the forward or right end of the presser foot.

In FIG. 37 there is shown a circuit diagram which illustrates the manner in which the two photoelectric cells are arranged to control the operation of the various solenoids which have been described. Thus a source of power 150, which may be a 220 volt, 60 cycles, 3-phase source, is arranged to be connected with the motor 65 of the sewing machine driving unit upon the closing of a manually operable switch 151. The usual means are providing for delivering a 6 volt, 60 cycle current from the motor 65 through lines 152 and 153 which are connected with a light bulb 154 for illuminating the stitch forming region of the sewing machine. Line 152 has a branch line adapted to be closed by a manually operable switch button 155. When this is operated, a circuit is completed to the line 153 through a relay coil 156 and a normally closed safety switch 157. Operation of relay 156 causes its arms 158 and 159 to swing downwardly into engagement with contacts 160 and 161, respectively. Switch arm 158 and contact 160 serve to complete a parallel circuit through the relay coil 156 and thus hold this relay in operative position after the push button 155 has been released. Contact 161 is connected, through a line having a normally closed switch 162, with an electric power source 163 which may suitably be a 110 volt, 60 cycle source. Thus current from source 163 flows through switch 162, arm 159, line 164, branch line 165, down to a transformer coil 166. The circuit is completed from the latter through a line 167 extending back to the power source 163. Current thus flowing through coil 166 generates a current of suitable potential in another coil 168 of the transformer. One side of coil 168 is connected with a rectifier 169, a resistance 170, a further resistance 171 and then a line 172 back to an intermediate point of the coil 168. Line 172 is connected through a branch line 174 with the light source 141, the opposite side of which is connected by a line 175 to the lower end of transformer coil 168. Thus, upon the operation of the relay 156 a light beam will be projected by the light source 141. When this light beam is not interrupted it will strike photocell 142 and thus reduce the resistance of the circuit through rectifier 169, resistances 170 and 171, a relay coil 173, current conducting means in photocell 142 and then line 172 back to the transformer coil 168. When the relay coil 173 is thus energized a two-armed switch 176 is operated into the position shown in FIG. 37. However, when the light beam from source 141 to photocell 142 is interrupted the resistance of the latter is greatly increased so that little, if any, current flows through the relay coil 173. A spring within the Micropositioner 1 will then rock the two-armed contact member 176 to engage the left arm of the latter with the contact below it, to complete a circuit from the line 164 to a line 177, then through a relay coil 178 and a line 179 to the line 167. Thus current from the source 163 will flow through the relay coil 178 and will rock the arms 180 and 181 of this relay downwardly into engagement with the contacts shown beneath them. Arm 181 thus closes a circuit from the line 164 to and through the clutch solenoid 68 and a normally closed clutch service switch 68a to the line 167. This will bring about the operation of the sewing machine by the continuously drive motor 65. At the same time, the switch arm 180 operated by the relay coil 178 closes a circuit from line 164 through the solenoid 100 which operates the stripper or work positioners in the manner previously explained. The opposite side of solenoid 100 is connected into return line 167 to the other side of the power source 163. Thus upon energizing of the relay coil 178, due to the interruption of the beam of light passing from source 141 to cell 142, the work positioner will be operated to correctly locate the edge of the work to be stitched and will advance the work toward the presser foot and into engagement with the feed mechanism of the sewing machine. The latter will continue to operate and provide the desired line of stitching until the trailing end of the work piece passes beyond the path of the light beam from source 141 to cell 142 and thus causes the relay 173 to operate the two-armed switch 176 into the position shown in FIG. 37. This will break the circuit through relay coil 178 and will thus break the circuits through the clutch solenoid 68 and the stripper or work positioner solenoid 100. However, the momentum of the sewing machine and the interconnected portion of the clutch will cause the sewing machine to continue to operate for a sufficient number of revolutions to complete the formation of the overedge seam on the work piece which is passing through the machine.

The circuitry involved in the control of the knife operating solenoid 113 and the stacker solenoid 137 is indicated in the left portion of FIG. 37. This includes a transformer coil 183 which has one end thereof connected through a line 182 with the line 167 and has an intermediate point thereon connected through a line 184 with the line 165. Accordingly, current is passed through the upper portion of coil 183 at the same time that the current is being passed through the upper portion of coil 166, this being upon the energizing of the relay coil 156. Energizing of the transformer coil 183 establishes a current in the coil 185 of the transformer, one terminal of which is connected with a line having a rectifier 186, a resistor 187, another resistor 188 and a return line 189 to an intermediate point of the coil 185. Connected with an intermediate point of the resistor 188 is a relay coil 190, the opposite end of which is connected to one terminal of photocell 145. The other terminal of this cell is connected by line 191 into line 189. A line 192, in parallel with the line 191, extends to the light source 144 whose opposite terminal is connected by a line 193 to the lower end of the coil 185. In this way a light beam is directed from the source 144 toward the plate 118, as has been previously explained, and is reflected toward the photocell 145. When no portion of the work being stitched is in the path of this beam, the cell 145 will have its resistance reduced to the point where sufficient current will flow through the relay coil 190 to shift a two-armed switch element 194 into the position indicated in FIG. 37. On the other hand, when the light beam mentioned is interrupted by some portion of the work, the resistance of photocell 145 will be so increased that a spring acting upon the element 194 within Micropositioner No. 2 will rock this element to lift the right arm out of engagement with the contact below it and to urge the left arm of element 194 into engagement with the contact beneath it.

Current is delivered to certain circuits under control of the Micropositioner No. 2 in the manner to be explained. A line 195 connected with the power source 150, when the switch 151 is closed, extends down to one terminal of an auto-transformer 196 the opposite end of the coil of which is connected by a line 197 to the return line of the power source. Thus a 220 volt, 60 cycle current will be passed through the auto-transformer 196. Line 195 is also connected through a branch line 198 and a line 199 with a relay arm 200. When this arm is in the position shown in FIG. 37 no circuit is completed. However, when the relay arm 200 is rocked downwardly, in the manner to be explained, it will engage a contact 201 which is connected through a line 202 with the stacker operating solenoid 137, the opposite end of which connects into line 197 and the return line from the power source.

Line 198 extending from one of the wires of the power source also delivers current through a resistor 203 and a rectifier 204 and then through a condenser 205 down to the switch element 194 of Micropositioner No. 2. When the element 194 is rocked in a counterclockwise direction, due to the interruption of the light beam from source 144 to photocell 145 by the passage of the forward edge of a work piece over the light reflecting region of plate 118 just in rear of the presser foot of the sewing machine, the circuit through rectifier 204, capacitor 205 and switch element 194 will be completed through a line 206, a normally closed knife service switch 207 up to the auto-transformer 196 and from the latter through line 197 to the return line of the power source. Substantially instantaneously upon the closing of this circuit a direct current charge will be stored in the capacitor 205 and when this has been fully charged no further current will flow through the circuit described. However, as the work being stitched advances through the sewing machine and is discharged from the latter, so that the trailing end of the work piece passes beyond the light reflecting area of plate 118, the Micropositioner No. 2 will have its relay coil 190 energized to swing the two-armed element 194 back to the position shown in FIG. 37. As soon as this occurs the condenser 205 will discharge and will cause a momentary flow of current through a line 208, a relay coil 209, a line 210 down to the element 194 of the Micropositioner and then back to the opposite side of the condenser 205. The circuit just mentioned is also completed through the knife solenoid 113 which is connected in parallel with relay coil 209 by lines 211 and 211a. This will bring about the operation of the thread chain cutter.

Energizing of the relay coil 209 causes shifting of its switch arm 212 into engagement with a contact at the upper end of a line 213 which has its lower end connected into the line 184. The opposite end of the switch arm 212 is connected through a line 214 with a relay coil 215 which is in turn connected through a line 216 to the normally closed stacker limit switch 140, the opposite terminal of which is connected through a line 217 into line 182. Thus a circuit is completed through the relay coil 215 and this causes the switch arm 200 to move downwardly into engagement with contact 201 and switch arm 200a to move downwardly into engagement with a contact connected into a line 218. This latter line is connected with line 213 and thus serves to complete another circuit through the relay coil 215 from the lines 182 and 184. Therefore, while the relay coil 209 is energized only for an instant, as the capacitor 205 is discharged and briefly energizes the relay coil 215, a holding circuit through coil 215 is set up.

Downward movement of the arm 200, due to the energizing of relay coil 215, closes a circuit through the stacker solenoid 137. This circuit extends from the power source through lines 195, 198 and 199, switch arm 200, line 202 and the stacker solenoid to the return line of the power source. As has been previously explained, the stacker solenoid remains energized until the arm 132 of the operating linkage engages the stacker limit switch 140 to open the latter. When this switch is opened the circuit through relay coil 215 will be broken and the arms 200 and 200a will be lifted into their inactive positions. This will break the circuit through the stacker solenoid and permit the stacker to be returned to its initial position by the spring means.

Certain of the parts entering into the above-described circuits are mounted within and on a cabinet 219 (FIGS. 5 and 6) which is suitably mounted on the supporting structure. It may, for example, be mounted on the supporting rods 17. The parts mounted within and on the cabinet include the Micropositioners, the relays, rectifiers, condensers, resistors, capacitor 205 and certain manually operable switches. Certain resistors and condensers shown in the circuits have not been described. These are provided primarily for the purpose of reducing the tendency toward arcing at the various contacts of certain of the relays employed, as the switch arms of the latter are operated to close or open various circuits. The relationship of these resistors and condensers to the other parts of the circuits will be readily understood from their showing in the circuit diagram.

Reference has been made, in the discussion of the circuitry, to a safety switch 157. This switch is shown in FIGS. 30 and 31. It is mounted on a bracket 220 (see also FIG. 9) which is suitably secured to the bottom of the bracket 147. Bracket 220 has a pair of outwardly extending ears 221 which carry a rod 222. A relatively stiff wire member 223 is mounted for rocking movement about the rod 222 and is provided with an arm or extension 224 by which it may be shifted through an angle of about 180°. A spring 225 connected at one end to the bracket 147 and at its other end to the member 223 serves to hold the latter either in its active position shown in FIG. 9 or in an elevated inactive position into which it may be shifted by the arm 224. The member 223 serves as a finger guard to prevent the operator from attempting to rethread the stitch forming devices of the sewing machine while the electrical system is in operative condition to bring about operation of the machine. When the member 223 is shifted to its upper position, or in fact shifted slightly away from its operative position, the safety switch 157 is opened by virtue of the fact that a projection 226 connected with member 223 is moved away from the plunger which operates the micro-switch 157. This results in opening the circuit from lines 152 and 153 and thus deenergizes the relay 156 so that the entire electrical system is thrown out of operation, except for the continued operation of the motor 65. After the rethreading, or other manual operation in the stitch forming region, has been performed, the finger guard 223 may be swung back into the position shown in FIGS. 9 and 30 to thus close the switch 157. To place the system in condition for operation again it is then necessary to press the reset button 155 to complete a circuit through the relay coil 156 in the manner explained.

In the use of the apparatus, which has been described in detail, a rack or table of any suitable construction carrying a supply of work pieces desired to be subjected to the serging or other seaming operation is conveniently located in relation to the sewing machine and the supporting table 12. Work pieces are removed one by one from the stack and placed upon the inclined section 13 of the work table in approximately proper position in relation to the sewing machine. Assuming that the motor has been placed in operation by closing of the switch 151 and the circuit through relay coil 156 has been established through the operation of the reset button 155, each work piece may be urged or permitted to slide downwardly toward the presser foot of the sewing machine until it cuts off the beam of light from source 141 to photocell 142. The machine and its adjuncts are then set into opertaion to properly position the work against a guide surface, advance the work into cooperation with the feed mechanism of the sewing machine, start the sewing machine to operate by energizing its clutch solenoid and, after completion of the seaming of the edge of the work, operate the knife to sever the thread chain and operate the stacker to pick up and stack the finished work piece. While a particular work piece is being seamed, the operator may apply the next work piece to the upper end of table section 13, so that the forward edge of each succeeding work piece may be spaced only a few inches from the trailing edge of the preceding work piece. It has been found that successive work pieces may be automatically handled in this way at an especially high rate, by relatively unskilled operators. The rate of production of the apparatus is considerably higher than that of a non-automatically controlled sewing machine being operated by a highly skilled worker. The sewing machine may be operated at 6000 cycles per minute and, in performing a serging operation, a seam having four stitches to the inch may suitably be formed.

While a preferred form of the invention has been described in considerable detail and certain specific modifications have been suggested, it will be understood that other modifications may be made within the scope of the appended claims. One thing that may be mentioned is that a power source 150 adapted to deliver current under 220 volts has been selected because of the particular construction of the stacker mechanism employed. If this were of a type capable of being operated by current delivered at 110 volts, the same power source could be used for delivery of current to the points indicated at 150 and 163 in FIG. 37.

The preferred control medium for bringing about the operation of the sewing machine and the various auxiliary devices is a light beam which is subject to being cut off upon the passage of work through its path, and thus control the operation of a micro-switch. However, the control medium could be an air stream which is subject to being cut off from a switch operating member as the work passes transversely through the path of the air stream. It will be understood that two such air streams may be employed in the regions in which the light beams are provided in the preferred embodiment of the invention. The air operated switches would be located beneath the work support and suitable openings would be provided in the latter for the passage of the air stream to the switch operating members when no work piece is in the path of the stream to cut it off. Also in this system, the various solenoids provided in the preferred embodiment for operating various devices may be replaced by pneumatically operated devices controlled by air valves, which are in turn controlled by the air switches mentioned.

What is claimed is:

1. Automatically controlled sewing apparatus which comprises a work supporting table along which work to be stitched may be readily advanced, a sewing machine disposed along the path of movement of work pieces along said work supporting table, an electric motor and connections therefrom for operating said sewing machine, a clutch in said connections, said clutch having a member driven by said motor when said clutch is operated, said connections also including means constantly connecting said member in driving relation with said machine for free running with said machine whenever said clutch is disengaged, the inertia of said machine and said means causing operation of said machine to continue through a limited number of cycles when said clutch is disengaged, means for projecting a control medium along a predetermined path, a power supply source, means adapted to receive energy from said source and connected to said clutch for operating the same whenever said energy receiving means is energized, means in the path of said projected medium and responsive thereto for controlling the delivery of energy from said power source to said clutch operating means, the work to be stitched being adapted to interrupt the projection of said control medium to said responsive means in the path thereof as the work approaches said sewing machine, and means controlled by said projected medium and the interruption thereof for respectively cutting off and bringing about delivery of energy from said power source to said means for operating said clutch.

2. Automatically controlled sewing apparatus of the character set forth in claim 1 in which said means for projecting a control medium is a light source and said means in the path of said projected medium is a light responsive member, said power source being a source of electric current, said means controlled by said projected medium comprising a relay, electrical connections from the power source to said relay, a switch in said last mentioned connections, means for closing said switch whenever said light beam is interrupted, and means for opening said switch whenever said light beam strikes said light responsive member.

3. Automatically controlled sewing apparatus of the character set forth in claim 1, said sewing machine having mechanism for feeding the work along a predetermined line, movable means for engaging the work to be stitched and upon movement urging the work transversely of the line of feed into engagement with a fixed guide, means for operating said work engaging means, and connections from said power source for delivering energy to said last mentioned means for operating the same, said connections being completed whenever energy is delivered to said clutch operating means.

4. In an automatically controlled sewing apparatus of the character set forth in claim 3, said sewing machine having a work supporting surface in the plane of the work supporting surface of said table and forming an extension of the latter, said work feeding mechanism in said sewing machine comprising a four motion feed dog and a spring urged presser foot for urging the work into engagement with said feed dog, said work engaging means when operated serving to advance the work into the path of said feed dog simultaneously with the lateral movement of the work into engagement with said fixed guide.

5. In automatically controlled sewing apparatus of the character set forth in claim 4, said work engaging means comprising a lever mounted for rocking movement in a plane transverse to the direction of advance of the work, said means for operating the work engaging means being adapted to rock said lever, a work engaging element mounted on said lever for turning movement about the longitudinal axis of said lever, and spring means normally urging said element in a direction toward the work pieces approaching the sewing machine, said work engaging element being turned against the action of said spring as said element is forced against the work by the operation of said means for operating the work engaging means.

6. In an automatically controlled sewing apparatus of the character set forth in claim 5, said work feeding mechanism comprising a plurality of four motion feed dogs arranged side by side, and means for imparting four motion movements to said feed dogs, said last mentioned means serving to impart a slightly greater work advancing movement to one of said feed dogs than the other, said feed dogs and said work engaging element cooperating to retain the free edge of the work against said fixed guide as the work is advanced in spite of any gradual inward or outward curvature of said edge.

7. In an automatically controlled sewing apparatus of the character set forth in claim 6, said feed dogs being given work advancing movements along slightly spaced lines parallel with said fixed guide, said one of said feed dogs being closer to said guide than the other of said feed dogs.

8. In an automatically controlled sewing apparatus of the character set forth in claim 1, said work supporting table having its upper surface inclined downwardly from its work receiving end toward said sewing machine, the inclination of said surface being such in relation to the frictional resistance to the movement of the work thereover that the gravitational force acting on the work will substantially equal said frictional resistance.

9. In an automatically controlled sewing apparatus of the character set forth in claim 8, means for readily adjusting the angle of inclination of the upper surface of said table and correspondingly adjusting the work supporting surface of the sewing machine.

10. In an automatically controlled sewing apparatus of the character set forth in claim 4, said connections from said electric motor to said sewing machine being such as to cause said sewing machine to continue to operate under the momentum of the driven parts after said clutch has been disengaged until the work has been advanced slightly beyond the rear end of said presser foot.

11. In an automatically controlled sewing apparatus of the character set forth in claim 4, said sewing machine being adapted to form a thread chain between successive work pieces fed through the machine, a thread chain cutter adapted to sever said thread chain in rear of said presser foot, power actuated means for operating said thread chain cutter, and connections from the power source to said power actuated means for operating the cutter to sever said thread chain, said last mentioned connections comprising a second means for projecting a control medium and a second control medium responsive means, said second means for projecting a control medium being adapted to direct said medium toward said second control medium responsive means, the path of said control medium being adapted to be interrupted by the work as the forward end of the latter advances beyond the presser foot and to remain interrupted until the trailing end of the work advances beyond the presser foot, and means responsive to interruption of the path of said second control medium and the subsequent removal of said interruption for operating said power actuated means to sever the thread chain.

12. In an automatically controlled sewing apparatus of the character set forth in claim 11, said power source comprising a source of electricity, said power actuated means comprising a solenoid and said last recited connections including a rectifier, a capacitor and switch means controlled by said second control medium responsive means, said switch means being adapted to cause an electric charge to be stored in said capacitor upon interruption of the path of said second control medium and being adapted to cause discharge of said capacitor through said solenoid upon removal of the interruption of said beam.

13. In an automatically controlled sewing apparatus of the character set forth in claim 12, said means for operating said work engaging means comprising a solenoid, said electric motor having means for providing a low voltage current output, a relay system in circuit with said output, a manually operable switch for closing the circuit in said relay system, and a relay in said system for controlling the delivery of current to said clutch operating means and to said solenoids.

14. In an automatically controlled sewing apparatus of the character set forth in claim 11, a shiftable member in the path of advance of the work by said sewing machine for receiving and stacking work pieces as they are delivered from said sewing machine, another power actuated means for shifting said member, and means for delivering energy to said another power actuated means for operating the latter in response to the interruption and removal of interruption of the path of the control medium from said second means for projecting a control medium as the work advanced by said sewing machine passes into and out of the path of the control medium from said second means for projecting a control medium to said second control medium responsive means.

15. In an automatically controlled sewing apparatus of the character set forth in claim 14, said another power actuated means comprising a solenoid and said means for delivering energy thereto comprises a circuit from a power source, a normally closed switch in said last mentioned circuit, means for opening said switch to break said circuit when said member has been shifted a predetermined distance, and spring means for restoring said member to its work receiving position adjacent said sewing machine when said circuit is thus broken.

16. In an automatically controlled sewing apparatus of the character set forth in claim 15, said work supporting table having a portion beyond the discharge side of the sewing machine which is inclined downwardly at a steeper angle than the main part of said table, said portion extending over said shiftable stacking member when the latter is in its normal position to thereby deliver the work to said member by gravity.

17. In an automatically controlled sewing apparatus of the character set forth in claim 16, said portion of said table being adjustable to vary its angle of inclination.

18. Sewing apparatus comprising a supporting structure, a sewing machine mounted on said supporting structure, said sewing machine having a work supporting surface, a work receiving table top mounted on said supporting structure and having a work supporting surface forming an extension of the work supporting surface of said sewing machine to support the work as it is advanced toward and away from the sewing machine, an electric motor and connections therefrom for driving said sewing machine, a clutch in said connections, a solenoid for operating said clutch, a work positioning device mounted on said supporting structure in alinement with and just in advance of the work supporting surface of said sewing machine, said device comprising a swingable arm and a work engaging element rockably mounted on the end of said arm for rocking movement about the longitudinal axis of said arm, spring means for normally urging said element into a predetermined angular position on said arm, a second solenoid for operating said arm to carry said element into engagement with the work and to cause rocking of said element on said arm, a work engaging surface on said element being thereby shifted in a direction toward said sewing machine and in a direction lateral to said first mentioned direction, a work guide on said supporting structure having a guide surface parallel with said first mentioned direction, said movement of said work engaging surface on said element serving to shift the edge of the work against and along said guide, and an electric power source and connections therefrom to said solenoids, said last mentioned connections including a switch for rendering the same effective to operate said solenoids.

19. In sewing apparatus of the character set forth in claim 18, said table top being inclined downwardly at an angle toward said sewing machine, the inclination of said table top being such that the frictional resistance to the movement of the work along the surface thereof is substantially offset by the gravitational force acting on the work.

20. In sewing apparatus of the character set forth in claim 19, a photo-electric cell, a light source adapted to project a beam of light toward said cell, the path of said light beam being interrupted by the movement of work along said table top as the leading end of the work approaches said sewing machine, and means for operating said switch under control of said cell to cause operation of said solenoids when said light beam is interrupted.

References Cited in the file of this patent

UNITED STATES PATENTS

| | | |
|---|---|---|
| 1,769,687 | Hamilton | July 1, 1930 |
| 1,910,200 | Bucking | May 23, 1933 |
| 2,442,839 | Carlson | June 8, 1948 |
| 2,483,138 | Helmer | Sept. 27, 1949 |
| 2,705,466 | Sargrove et al. | Apr. 5, 1955 |
| 2,977,908 | Winz et al. | Apr. 4, 1961 |
| 3,044,424 | Kehrer | July 17, 1962 |